Oct. 21, 1958   E. A. HERIDER ET AL   2,856,988
SPRING SEAT STRUCTURE AND METHOD OF ASSEMBLY
Filed Oct. 18, 1955   4 Sheets-Sheet 1

INVENTORS.
Elmer A. Herider
Kennard Pitts
BY Webb, Mackey, & Burden
THEIR ATTORNEYS Oct. 21, 1958 E. A. HERIDER ET AL 2,856,988
SPRING SEAT STRUCTURE AND METHOD OF ASSEMBLY
Filed Oct. 18, 1955 4 Sheets-Sheet 2

INVENTORS.
Elmer A. Herider
Kennard Pitts
BY Webb, Mackey & Burden
THEIR ATTORNEYS Oct. 21, 1958     E. A. HERIDER ET AL     2,856,988
SPRING SEAT STRUCTURE AND METHOD OF ASSEMBLY
Filed Oct. 18, 1955     4 Sheets-Sheet 3
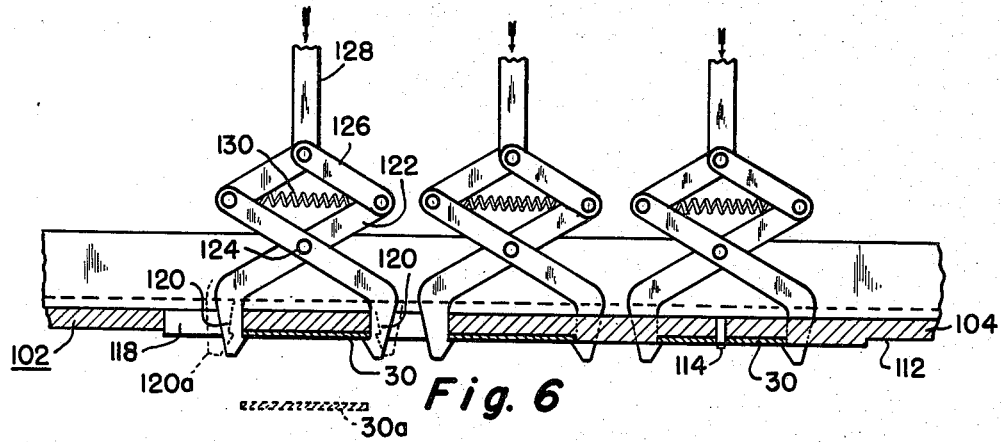
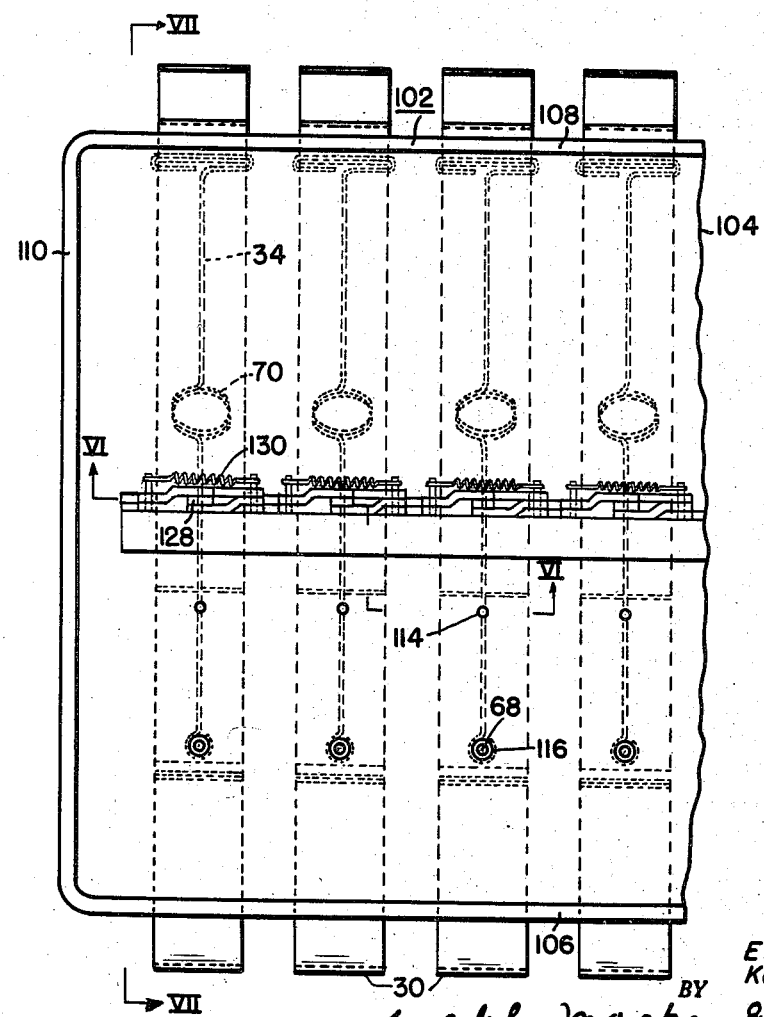
INVENTORS.
Elmer A. Herider
Kennard Pitts
BY Webb, Mackey & Burden
THEIR ATTORNEYS

United States Patent Office 2,856,988
Patented Oct. 21, 1958

2,856,988

SPRING SEAT STRUCTURE AND METHOD OF ASSEMBLY

Elmer A. Herider, Dearborn Township, Wayne County, and Kennard Pitts, Detroit, Mich., assignors to Rockwell-Standard Corporation, a corporation of Pennsylvania Application October 18, 1955, Serial No. 541,287

18 Claims. (Cl. 155—179)

The present invention relates to a spring seat structure and a method of assembly of the same, particularly a seat structure in which springy flat strips of metal are used for springs.

In the past, a wire construction known as the zigzag spring has proved very popular for seating, for instance for use in the back rests and seat cushions of automotive seating structure, and the sinuously bent wire elements which perform the load carrying function in a zigzag spring seat construction are tied together in rows to provide mutual lateral stability and general unity for one another. Singly, these wire spring elements have little resistance to twist between their opposite ends and by reason of their resulting torsional freedom would, if individually used, twist and display general lateral instability under seating loads. Tied together, usually with edge wires and also tie wires to unify them into a stable structure, these wire elements introduce certain complications in a seat assembly operation.

It is an object of the present invention to provide a seat structure having flat spring elements for performing the load carrying function, these elements being substantially wider than thick and, hence, having considerable individual lateral stability when bowed longitudinally and anchored at their opposite ends. According to a feature of the invention, these flat spring elements may have, but do not necessarily require tie wires, for the reason that they inherently have sufficient lateral stability. In many instances, the tire wires are not only unnecessary but are undesirable in flat spring seating structures. In one physically constructed embodiment of the invention, the pad over the elements and its covering upholstery proved adequate to enclose and unify the structure. The elements themselves were then free to work independently of one another beneath the padding.

Another object of the invention is the provision of a spring seat structure having effective and simple anchoring means for the spring elements thereof.

An additional object is to provide an effective assembly fixture and a proper method for assembling and installing the spring elements defined in the preceding object.

A further object is to provide a power driven anchor press means and a properly effective method of permanently locating and anchoring the spring elements therewith.

Further features, objects, and advantages of the present invention will either be specifically pointed out or become apparent when, for a better understanding of the invention, reference is made to the following description taken in conjunction with the accompanying drawings in which, in general:

Figure 5 is a top plan view of a fixture for use in assembling the spring strips in the seat structure;

Figures 6 and 7 are front and side elevational views taken along the section lines VI—VI and VII—VII of Figure 5.

Figure 1:
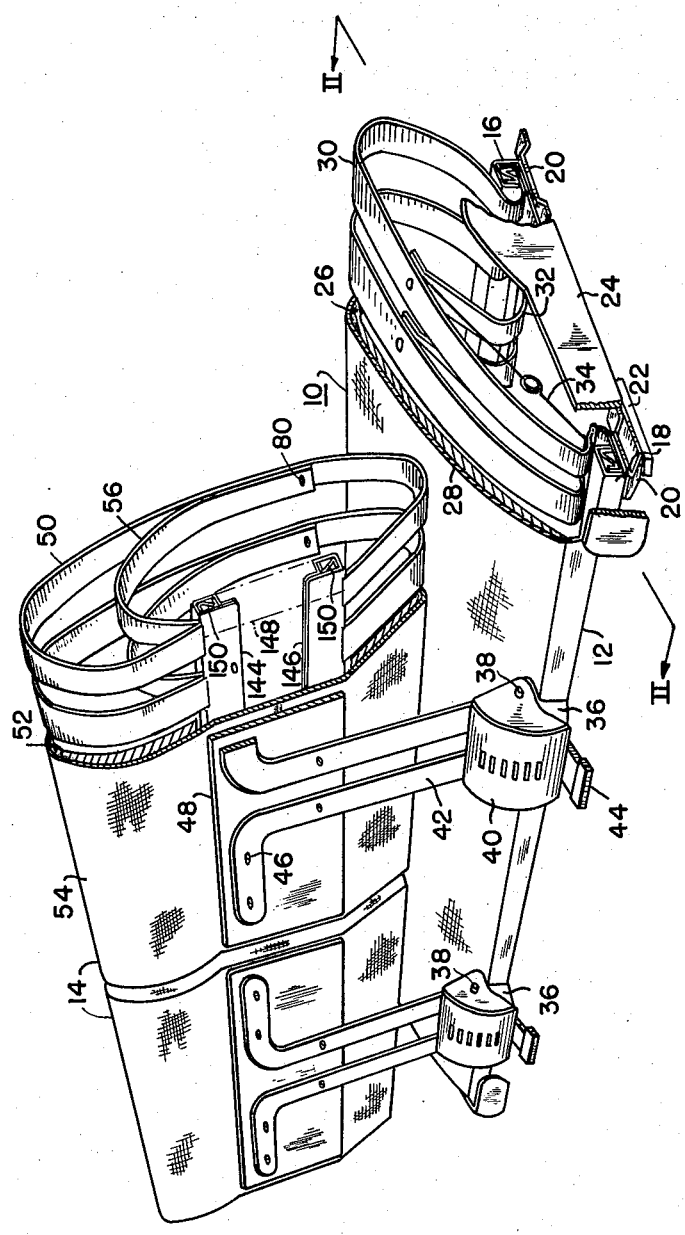
Figure 1 is a perspective view of the present strip spring seating structure.
Figure 2:
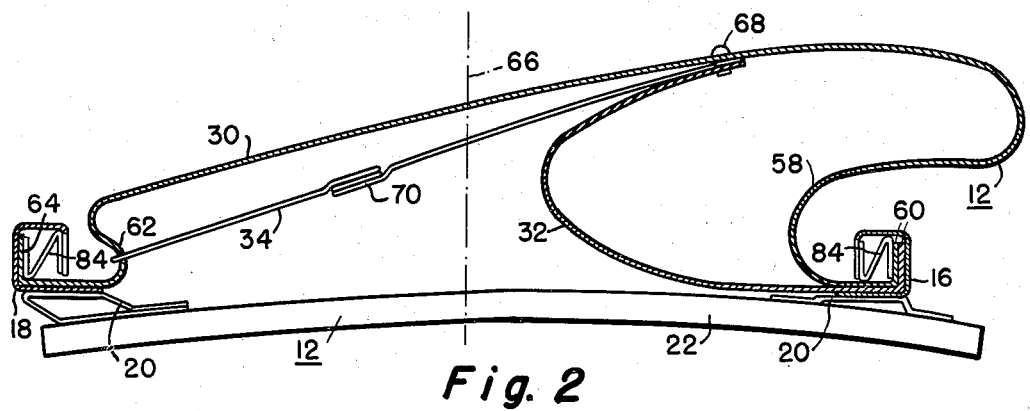
Figure 2 is a side elevational view in section through the seat cushion portion of the structure.
Figures 3, 4:
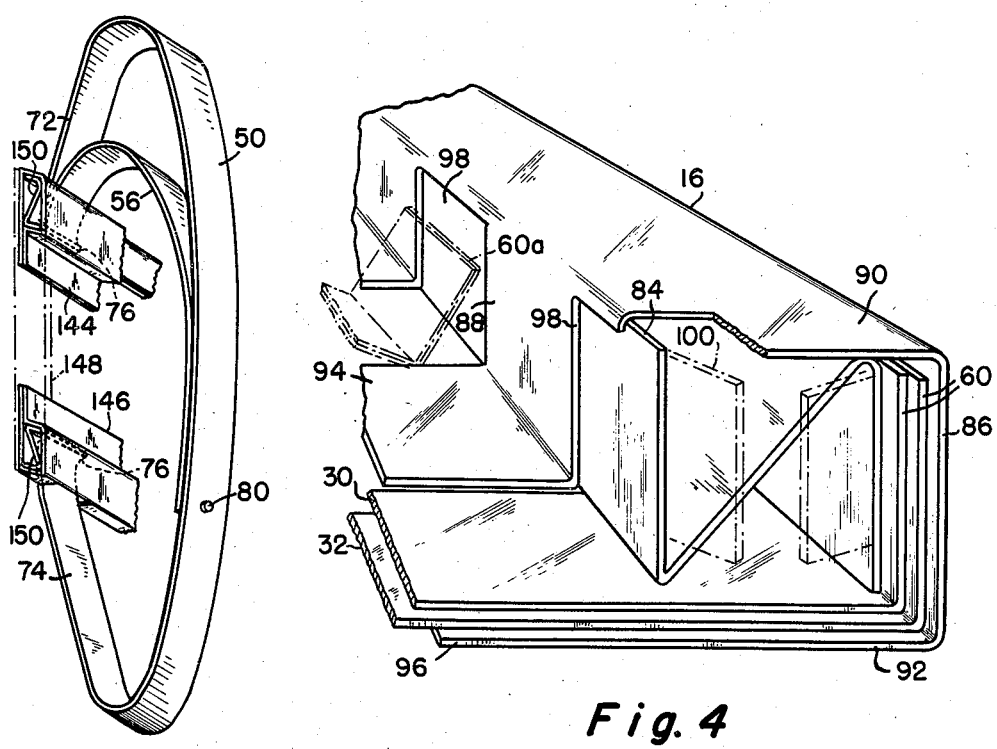
Figure 3 is a perspective view of a typical spring strip element used in the back rest.
Figure 4 is an enlarged perspective view of a portion of Figure 2.

In particular, in Figures 1, 2, and 3, an automotive type seat structure 10 is shown having a generally rectangular seat cushion portion 12 and a pair of split type adjustable back rest portions 14 swingably mounted thereupon. The seat cushion portion 12 includes a pair of front and rear cross rails 16, 18 of hollow box construction which are supported at their opposite ends by means of foot brackets 20. Two or more generally longitudinally extending side rails 22 carry the brackets 20 at their opposite ends and cooperate with the front and rear rails 16 and 18 to form a welded-together rectangular seat frame. Suitable decorative shells 24, which may be of plastic material, are provided adjacent the opposite ends of the seat structure 10 to conceal the rails and internal structure of the seat. A fairly thick section of foam rubber padding 26 appropriately covered by means of seat upholstery fabric 28, rests in common upon the mid-portions of a longitudinally extending series of generally C-shaped flat strip springs 30 of substantial bow shape between their opposite ends. The opposite ends of the springs 30 are respectively anchored in the front and rear rails 16, 18 of the seat frame in a manner more particularly described hereinafter. Each of the springs 30, and there may be approximately fifteen per seat frame, is reinforced against collapse by means of a spring strip reinforcing or helper member 32 of general J-shape and is further reinforced by means of a wire helper spring 34 suitably connected to the main spring 30.

At spaced apart points lengthwise thereof, the hollow rear rail 18 fixedly mounts a pair of stationary brackets 36, each of which carries a fixed pivot pin 38. The pivot pin 38 pivotally supports a swinging hinge bracket 40 which carries a pair of companion upstanding back rest arms 42 of general inverted L-shape. The swinging hinge bracket 40 is adjustable to various angular positions about the swing axis of the pivot pin 38 as a center by means of one or more manually actuated latching controls 44. The hinge bracket 40 and the latching controls 44 form no per se part of the present invention and are separately disclosed and more fully described in a copending patent application Serial No. 541,229, filed October 18, 1955, in the names of Elmer A. Herider et al., the co-inventors thereof, now Patent No. 2,827,951, granted March 25, 1958. The short legs of the L-shaped vertical upstanding back rest arms 42 are screwed or bolted at 46 through a rectangular back plate 48, which is used as a trim cover and is composed of a Masonite board, covered with trim, into the upper retainer 144 and lower retainer 146 of the back frame. An angle iron 148 is used at each end of the retainers 144 and 146 and serves as a trimming edge and brace. A plurality of C-shaped strip springs 50 of general bow-shape have their opposite end portions inserted and locked into the upper and lower retainers 144 and 146 of the back frame with a Z strip 150 in the identical way used to secure the cushion spring elements to the front and rear retainers 16 and 18 of the cushion frame of which will be fully described hereinafter. The springs 50 support a back rest pad 52 which is suitably covered with upholstery fabric material 54. Each of the C-shaped strip springs 50 is reinforced by means of a generally J-shaped flat spring strip reinforcing member 56 the longer end being secured to the C-shaped strip spring 50 with a rivet 80 and the short end being anchored into the upper retainer 144, along with the upper end of the C-shaped strip string 50.

In particular reference to Figure 2, the flat springs 30 in the cushion portion 12 have a double bent front end portion 58 which is reversely bent on itself in general S-shape and carries a transverse generally upstanding flange 60 at the front or forward end of its reversely bent extremity. Similarly, the double bent rear end portion 62 is reversely bent on itself in a general S-shape and has a transverse generally upstanding flange extremity 64. The extremities of the two end portions of the spring 30 are received within the hollow interiors of the front and rear rails 16, 18 which are of general box cross section. The J-shaped helper spring 32 has a similar short upstanding flange 60 overlapped with the upstanding flange 60 of the spring 30. At a point on the midportion of the spring 30 forwardly of its vertical midplane 66 between the front and rear rails 16, 18, the spring is provided with a rivet 68 which is accordingly disposed closer to the S-shaped front end portion 58 of the spring than to the rear end portion 62 thereof. The rivet 68 fixedly secures the shorter leg of the J-shaped reinforcing strip 32 to the midportion of the spring 30 in a manner to clamp therebetween one of the opposite end portions of the reinforcing wire spring 34. Intermediate the opposite ends of the wire spring 34, there is integrally formed a 2½ coil helical portion 70 which resists stretch of the wire spring 34 between its opposite ends. The opposite end of the wire spring 34 is looped about and pivotally connected to the outwardly facing loop in the S-shaped rear end portion 62 of the spring 30. Application of a vertical load in the vicinity of the central midplane 66 of the seat cushion structure 12 bottoms each spring strip 30 for a substantial part but not all, of the coextensive unpart of the length of its chordally disposed wire spring 34 which it contacts, and both causes the wire spring 34 to extend against the resistance of its coils 70 and causes the J-shaped flat spring member 32 to flex against the resistance of the legs thereof to being moved closer together.

In more particular reference to Figure 3, the back rest strip springs 50 have their opposite end portions doubly bent on themselves at 72 and 74, respectively, to provide short transversely extending in-turned flanges 76, which are parallel to one another. The in-turned flanges 76 are inserted into slots in the upper and lower retainers 144, and 146 and locked into place by inserting a Z strip 150 through one end of the retainers by a process that will fully be explained hereinafter with the cushion constructions flat steel spring elements. The longer leg of the J-shaped reinforcing strip 56 is riveted at 80 to the mid portion of the spring strip 50 at a downwardly offset point closer to the lower leg portion 74 than to the upper leg portion 72. The shorter leg of the J-shaped strip 50 is fastened within the upper retainer 144 along with the upper end portion 76 of the main strip 78. The strip springs 30 and 50 are preferably of spring strip steel.

Means is provided for anchoring the end portions of the spring strips 30 to the front and rear rails 16, 18.

Illustrative of one example of such anchoring means is a locking device 84 in Figure 4. The front rail 16, selected for illustrative purposes in Figure 4, is of rectangular hollow box section having pairs of opposed side walls 86 and 88 at the front and the rear, and having a top wall 90 and a bottom wall or floor 92. At a point adjacent the lower rear corner of the rail 16, the rear side wall 88 has an integral laterally extending flange 94 which is mounted above a lower lateral flange 96 integral with the bottom wall 92 of the rail 16. The upper lateral flange 94 and the rear side wall 88 are slotted at predetermined points along the length of the rail 16 to provide a plurality of spaced apart spring receiving openings 98 of general rectangular cross section. The locking device 84 is a strip of general Z-shape in cross section so as to be laterally deflectable and integrally carries at its leading end a pair of wedge-shaped lugs 100 for facilitating the motion of the device 84 longitudinally of the hollow rail 16. One of the legs of Z-shaped device 84 engages the interior of the rear side wall 88 of the rail 16 so as to block off the openings 98 therethrough. The opposite leg of the device 84 engages and clamps the upstanding flanges 60 of the springs 30 and 32 against the interior of the front side wall 86 of the rail 16. The device 84 is coextensive in length with the rail 16 and firmly presses the springs 30, 32 against the inside of the front and bottom walls thereof so as to prevent any shift or withdrawal of the springs 30, 32 from the interior of the rail 16. When the device 84 is absent from the interior of the rail 16, thereby leaving the openings 98 free, the bent end portions 60 of the springs 30, 32 are readily insertable from the outside dotted line position 60a of Figure 4 through an appropriate opening 98 into the interior of the hollow rail 16. Such insertion of the springs 30, 32 for lodging the ends 60 thereof within the rail 16 requires the foreshortening of the opposite ends of the spring 30.

Means is provided for such foreshortening of a series of the springs 30 preparatory to fitting them into the front and rear rail 16 of the seat frame.

Figure 7:
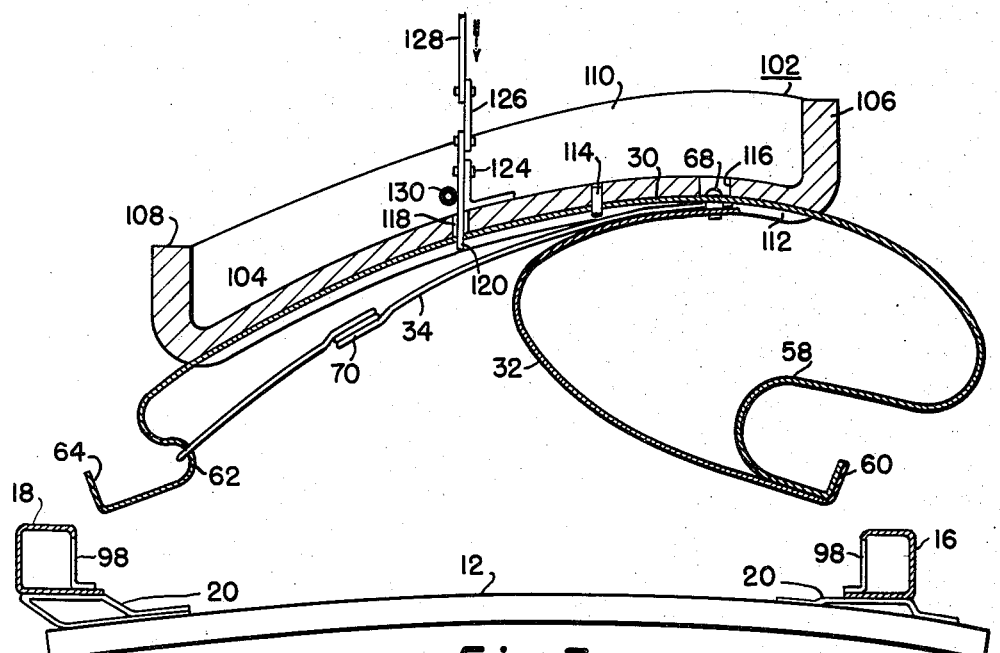

Illustrative of one example of such foreshortening means is a fixture 102 of Figures 5, 6, and 7. The fixture 102 has a generally rectangular body portion 104 somewhat simulative of a segment of a cylinder, and provided with an upstanding skirt formed by an integrally joined set of front, rear, and side transverse flanges 106, 108, and 110. The body portion 104 curves concavely downwardly, being curved in one direction only, namely, in the direction between the front and rear flanges 106, 108, as best seen in Figure 7, and not in the direction between the side flanges 110 thereof. The concave underface of the fixture body portion 104 is slotted with a plurality of grooves 112 of generally shallow rectangular cross section which extend in the curved direction of the body portion 104 so as to be curved between their opposite ends. Each of the grooves 112 is of sufficient width to receive a seat cushion strip spring 30 and mounts therein an anchoring pin 114 receivable within a pilot hole suitably provided in the spring 30 at just about the midportion thereof. A plurality of openings 116 extending through the body portion 104 of the fixture registers with and individually receives the rivets 68 which protrude out of the top of the springs 30. A series of aligned rectangular openings 118 forms a rectilinear path across the body portion 104 located slightly to the rear of the line of pins 114. The openings 118 are arranged in alternation with the grooves 112 so as to straddle the latter by pairs and receive therethrough the hooked jaw portions 120 of each of a pair of scissor-like tongs 122 which extend through the body portion 104 from the upper convex side of the fixture. The tongs 122 are fixedly pivotally anchored by means of a bracket-supported pivot 124 for scissor-like movement whereby the jaws 120 oscillate from the operative solid line position of Figure 6 into a dotted line inoperative position 120a which frees the grooves 112 for entry and for exit of the strip springs 30.

A pair of upper links 126 cooperates with the tongs 122 to form a parallelogram linkage which at the upper end is pivotally connected to a push rod 128. Downward movement of the push rod 128 acting through the links 126 causes the tongs to rock about the pivot 124 and appropriately open the jaws 120 thereof. Normally, the tongs 122 are urged into jaw closing position by means of a helical spring 130 bridging horizontally across the parallelogram linkage and anchored at its opposite ends to the tongs 122 and links 126.

The radius of curvature of the slots 112 in their longitudinal direction between the front and rear flanges 106, 108 is considerably less than the normal radius of curvature of the midportion of the spring 30 in its relaxed position. Accordingly, when the springs 30 are forced into the slots 112 so as to conform to the curvature of the latter, the opposite end portions 58, 62 of the C-shaped springs 30 foreshorten toward one another and, when the jaws 120 of the tongs 122 engage the spring 30, the spring is held under compression in its foreshortened state. The spring strips 30 are readily installed in the slotted grooves 112 under such compression by appropriate manual manipulation, one spring at a time. They are preferably released simultaneously from the fixture 102.

In the operation of the assembly fixture of Figures 5, 6, 7 for lodging the flanged end extremities 60, 64 of the spring 30 in the respective interiors of the front and rear rails 16, 18, the fixture 102 complete with a series of compressed foreshortened springs 30 carried thereby is brought down to a superposed point above the seat frame such that the opposite ends of the spring 30 in its foreshortened compressed state are aligned with the openings 98 in the front and rear rails. Thereafter, downward actuation of the push rods 128, individually but preferably in unison, causes the tongs to release the springs 30 with the result that the midsection of their body portion snaps down to a less severe bow shape away from the fixture to occupy the displaced position 30a, Figure 6, whereupon the foreshortened opposite end portions extend and are received within the interior of the hollow rails 16, 18 in accordance with the showing of the preceding Figure 2. Thereafter, the springs are retained between the rails under slight compression and the spring ends are anchored within the rails by means of a locking device according to Figure 4. That is to say, the springs 30 do not resume a freely relaxed, fully extended state when installed in the frame.

Means is provided to insert the locking device of Figure 4 into the hollow rails 16.

Figure 8:
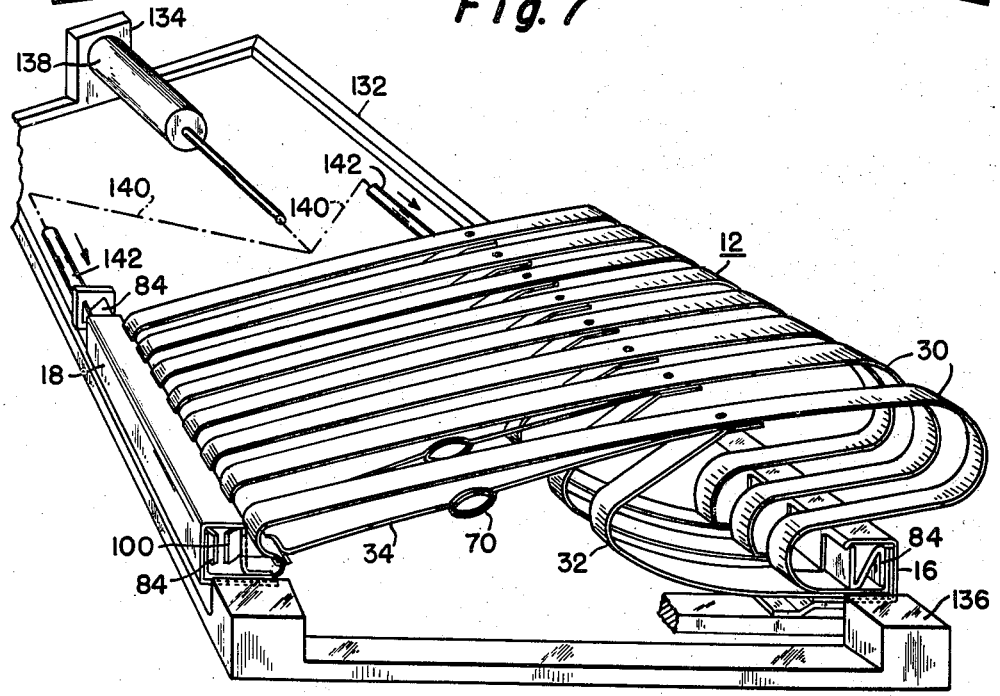
Figure 8 is a perspective view of the seat cushion portion and an anchor press fixture used during the assembly of the same.

Illustrative of one example of such inserting means is a press fixture 132 having a bed on which the assembled spring and seat portion 12 are received. A plurality of spaced apart upstanding stops 134 and 136 on the bed of the fixture 132 respectively engage a double acting piston and cylinder motor 138 and the ends of the front and rear rails 16, 18. The piston rod of the piston and cylinder 138 is connected by means of a pair of arms appearing diagrammatically at 140, Figure 8, which, in turn, operate a pair of plungers 142 engageable with the ends of the locking devices 84 prior to their insertion within the hollow rails 16 and 18. Under the application of appropriate hydraulic pressure from a pressure source, not shown, the motor 138 extends the piston rod thereof to press the locking devices 84 longitudinally into the rails 16 and 18 to a final position effectively preventing lateral displacement or withdrawal of the ends of the spring 30 from the rails. As previously noted, the locking device 84 having the general Z cross section is coextensive in length with the respective rail 16 or 18 within which it is received.

It will be apparent from the foregoing that a new and satisfactory type of strip spring element may be employed in seat constructions which may be formed inexpensively from rolls of flat steel spring strip. It is to be appreciated that the present method of attaching the spring elements to the frame construction is a simple but effective operation. The independent action of the resulting laterally stable strip elements will be readily appreciated when it is considered that they individually adjust to localized loads. Additionally, an improved and effective locking strip for use in retaining the spring elements is shown in conjunction therewith.

Variations within the spirit and scope of the invention described are equally comprehended by the foregoing description.

While I have described certain presently preferred embodiments of my invention, it is to be understood that it may be otherwise embodied within the scope of the following claims.

I claim:

1. A flat spring having a bowed midportion, and double bent opposite end portions laterally offset from the same side of the midportion, and a tension member secured to and chordally bridging between the midportion and the loop of one of the bent end portions of the spring to reinforce the same.

2. A seat construction having spring supporting rails, a main spring having a midportion adapted to span two rails and rail engaging ends laterally offset from the same side of the midportion, said rail engaging ends having L-shaped mounting portions at the terminals, said rails being of hollow box cross section presenting spring receiving openings and fully enclosing said L-shaped terminal mounting portions of the spring ends disposed in said openings, and helper spring means secured to and bridging between the midportion and at least one of the end portions of the main spring.

3. In combination, a first spring having a bowed midportion and double bent opposite end portions laterally offset from the same side of the midportion, and a J-shaped reinforcing spring having one leg secured to the midportion and one leg with an end portion secured to one end portion of the spring to bridge therebetween and reinforce the first spring, the aforesaid one end portions presenting deflected end attachment flanges for securement together in overlapping relationship.

4. In combination, a flat spring having a bowed midportion and double bent opposite end portions laterally offset from the same side of the midportion, and a wire spring stressed in tension having one of its opposite ends secured to the midportion of the flat spring and having the other of its ends secured to a loop in one bent end portion of the flat spring to bridge chordally therebetween.

5. In combination, a flat spring having a bowed midportion and double bent opposite end portions laterally offset from the same side of the midportion, and a chordally disposed wire spring having a plurality of coils at the midportion thereof between opposite ends of the chord and having one of its opposite ends secured to the midportion of the first spring and having the other of its ends secured to a bent loop in one end portion of the flat spring to bridge therebetween.

6. A springy metal strip for a seat structure having a bowed midportion and double bent opposite ends laterally offset from the midportion, hollow transverse mounting rails enclosing the opposite ends of said springy metal strip which press inwardly thereagainst in retaining the lower curvature of the strip, and a springy bridging member chordally secured to a loop in one end portion and to the midportion of the strip at a point more closely adjacent the opposite end portion thereof and reinforcing the same.

7. In combination, a spring retaining frame including a spaced pair of hollow enclosure members, a springy metal strip therebetween having a bowed midportion and reversely bent opposite ends laterally offset from the midportion, and trapped within the hollow enclosure members and a pair of spring bridging members secured between the midportion of the strip and each of its opposite ends to reinforce the strip.

8. A springy metal strip having a bowed midportion and bent opposite ends laterally offset from the midportion, a transversely disposed pair of hollow enclosure members in which the opposite ends of the strip are secured, a pair of springy bridging members extending between the midportion of the strip and each of its opposite ends, and means securing the bridging members to the strip including a rivet on the midportion common to the bridging members.

9. A springy metal strip for a seat structure having a bowed midportion and double bent opposite end portions laterally offset from the midportion, a transverse rail of hollow box cross section forming an enclosure for one of said end portions, said end portion passing across the inside of the rail from an introduction opening to the opposite side and having a transversely bent anchoring flange at that side, and a springy bridging member secured to one end portion and to the midportion of the strip at a point more closely adjacent to the said one end portion of the strip than to its opposite end portion and reinforcing the strip.

10. In a seat structure, a frame of hollow cross members having inwardly opening pairs of openings at the opposite sides thereof, a row of flat spring elements each having a bent end enclosed within the hollow interior of the different members through one opening of each inwardly opening pair and secured therein, and retainer means disposed within the hollow interiors of said members and securing the enclosed ends of the spring elements therein.

11. In a spring construction, a rail member of hollow construction having spaced apart side slots provided therein, a bowed spring element having its end enclosed in the rail member and registering with one of the slots therein provided, and retainer means within the hollow interior of the rail member holding said end firmly against an adjacent inside wall of the rail member.

12. In combination, in a spring construction, a pair of parallel hollow rails having spaced apart openings provided in the inside walls thereof, a series of bowed spring elements each having an end enclosed within the hollow interior of the rails through opposite ones of the openings therein provided, and retainer means within the rail holding said end of each spring element firmly against the interior of the rail.

13. In a seat structure, a rail having spaced apart slots provided in the side thereof, a plurality of spring elements each having an end protruding through a slot in the rail, and a compressible anchoring strip slidably pressed into the rail to block the slots and anchor the ends of the spring elements thereto.

14. In a seat structure, a rail member having spaced apart slots provided at one side thereof, a row of flat spring elements each having a bent end protruding through the slots in the member, and a compressible anchoring strip of Z-section slidably related with the rail member to block the slots and anchor the ends of the spring elements therewithin.

15. A tension load spring for seat constructions having a flat coiled midportion enabling it to have limited stretching movement between its opposite end portions, and looped means integral with each end portion for attachment to spaced points on a main spring in the seat construction.

16. A spring according to claim 15 wherein the midportion conforms to a helix consisting of few complete coils and a partially complete coil.

17. A spring for seat constructions according to claim 15 in combination with a flat strip, main spring bent so as to bow in the middle and presenting an S-shaped portion at the rear end, the looped means at the corresponding end of the tension spring being interengaged with a loop in said S-shaped portion enabling the tension spring to relatively rotate under load about that end.

18. In combination, a flat spring bent to curve on an arc for a substantial length between its midportion and the loop in a reversely bent end portion thereof and a stretchable wire spring having means for securing one end to the midportion of the flat spring and having means at the other end for pivotal attachment to the loop enabling the wire spring to rotate about its other end as it stretches under load.

References Cited in the file of this patent

UNITED STATES PATENTS

| | | |
|---|---|---|
| 132,350 | Briggs | Oct. 22, 1872 |
| 1,803,750 | Droddy | May 5, 1931 |
| 2,086,992 | Weber | July 13, 1937 |
| 2,115,400 | Schlappritzi et al. | Apr. 26, 1938 |
| 2,253,914 | Probst | Aug. 26, 1941 |
| 2,264,006 | Probst | Nov. 25, 1941 |
| 2,518,867 | Clary | Aug. 15, 1950 |
| 2,571,572 | Harmon | Oct. 16, 1951 |

FOREIGN PATENTS

| | | |
|---|---|---|
| 12,152 | France | July 26, 1910 |